United States Patent

Behnke et al.

[11] Patent Number: 5,890,961
[45] Date of Patent: Apr. 6, 1999

[54] HARVESTER WITH ELEVATOR WITH AND MEASUREMENT OF HARVESTED PRODUCT QUANTITY

[75] Inventors: Willi Behnke, Steinhagen; Norbert Diekhans, Gütersloh, both of Germany

[73] Assignee: Claas KGaA, Harsewinkel, Germany

[21] Appl. No.: 15,677

[22] Filed: Jan. 29, 1998

Related U.S. Application Data

[62] Division of Ser. No. 755,962, Nov. 25, 1996.

[30] Foreign Application Priority Data

Nov. 25, 1995 [DE] Germany .......................... 195 440 579

[51] Int. Cl.$^6$ ...................................................... A01F 12/46
[52] U.S. Cl. .............................................. 460/6; 460/114

[58] Field of Search .................................. 460/6, 4, 7, 119, 460/114, 116, 149, 150

[56] References Cited

U.S. PATENT DOCUMENTS

| | | | |
|---|---|---|---|
| 5,318,475 | 6/1994 | Schaock et al. | 460/6 X |
| 5,518,454 | 5/1996 | Twilley et al. | 460/7 |
| 5,685,772 | 11/1997 | Andersen et al. | 460/6 |
| 5,750,877 | 5/1998 | Behnke et al. | 460/7 X |

*Primary Examiner*—Terry Lee Melius
*Attorney, Agent, or Firm*—Michael J. Striker

[57] ABSTRACT

A quantity of a harvested product supplied by an elevator of a harvester from a lower side to an upper side is determined by measuring an elevator when it is located with the harvested product with consideration of weight of the empty elevator.

37 Claims, 3 Drawing Sheets

HARVESTER WITH ELEVATOR WITH AND MEASUREMENT OF HARVESTED PRODUCT QUANTITY

This application is a Divisional of Ser. No. 08/755,962 filed on Nov. 25, 1996.

BACKGROUND OF THE INVENTION

The present invention relates to an agricultural machine with an elevator which transports a harvested product supplied from below for an upper-side further transportation or storage in a transporting direction, wherein at least one first scale is arranged on or in the elevator for measuring harvested product quantity.

During harvesting with harvesters of the above mentioned type, for example harvester threshers, an exact control of each instantaneously harvested harvesting product quantity is needed in order to guarantee an efficient use of the harvester and to timely take into consideration corresponding disturbances. Moreover, it is necessary to determine the received harvested product in a time interval, for example a day or an operational hour, for example in order to provide computations of dependent on the quantity during the labor work. Furthermore, it is possible to produce an accurate harvesting cadastre.

The German patent document DE 31 24 35 A1 discloses an agricultural harvester, in particular a harvester thresher, in which the harvested product is loaded from a co-movable container over an elevator or a conveyor in an available motor vehicle or a trailer. During the loading process the weight or the harvested product quantity is weighed by a continuous scales at the harvested product inlet and at the outlet of the elevator. Alternatively, it is proposed to count the revolutions of a filled emptying screw and in this manner to determine the loaded harvested product quantity.

For continuous measurement of the harvested product during the harvesting it is known to determine the harvested product quantity capacitatively during its passage through a capacitor arrangement located for example behind the elevator outlet. The disadvantage of this measuring method is that the different moisture in the measuring chamber falsifies the measuring results, so that a continuous calibration is necessary. Furthermore, the electrodes in the measuring chambers are damaged by the passing harvested product, so that these measuring devices are very maintenance-intensive.

In addition to the above mentioned problems, these methods involve very high measuring-, compensation- and computing expenses.

SUMMARY OF THE INVENTION

Accordingly, it is an object of the present invention to provide a method of the above mentioned general type and a corresponding harvester with an elevator, in which the harvested product transported in a predetermined time through the elevator can be measured with low expenses and simultaneously with high reliability and accuracy at any time during the harvesting.

In keeping with these objects and with others which will become apparent hereinafter, one feature of the present invention resides, briefly stated, in that the elevator is weighed. From the total weight of the whole elevator unit together with the corresponding content, with the known empty weight of the elevator unit, it is possible to directly determine the harvested product quantity located in the elevator.

This objective can be achieved when the first scale is arranged on at least one suspending or supporting point of the elevator on the harvester, the total weight of the elevator together with its content is measured, and the elevator has at least one evaluating device to which the measured data are transmitted and to which further data can be inputted so that the evaluating device from the data determine the transported harvested product quantity for subsequent storage and/or subsequent processing and/or for indication of this value.

When the method is performed and the harvester is designed in accordance with the present invention, it is possible at any time to determine the through flow quantity of the harvested product transported through the elevator in a simple manner and without high computation expense.

Preferably the total weight of the elevator is measured continuously or quasi-continuously, or in other words in very short time intervals one after the other. In principal, it is however possible to perform the measurements only at predetermined times or in predetermined time intervals.

For determination of the harvested product quantity transported in a predetermined time interval, the total weight value measured at the different time points inside the predetermined time interval is multiplied with the corresponding transporting speed of the elevator provided at the time points and the thusly determined data are summed and integrated over the time.

Either the individual values before the summation and integration or the total value after the summation or integration are subdivided by the effective transportation path of the harvested product in the elevator. The effective transportation path in the elevator corresponds exactly to the path which the harvested product covers in the elevator when it is loaded with its weight in the elevator. It corresponds substantially to the length of the elevator and can be measured in principle on the elevator. However, it is possible to utilize this value as a calibrating value and to correspondingly adjust the same during calibration of the device which must be performed conventionally for delivery of the harvester eventually in the workshop or during maintenance works.

The transporting speed of the elevator is measured preferably simultaneously with the weight process by a corresponding measuring device in the harvester or on the elevator. In harvesters with a constant transporting speed in the elevator, a corresponding constant value is inputted in the evaluating device, and a transporting speed measuring device is not needed in such harvesters. In this case, the multiplication with the constant transporting speed value is performed after the summation or integration of the individual values.

In a relatively simple conventional form, the elevator is composed of a transporting shaft, a return shaft, an elevator head, an elevator leg, and a motor-driven conveyor band or a conveyor change when is tensioned by deviating wheels arranged in the elevator leg and in the elevator head. The harvested product is supplied laterally below to the elevator, is transported laterally above by the elevator and filled in a storage.

The acceleration forces during filling and throwing out the harvested product and the deviating forces of the harvested product are compensated on the deviating wheels, since the total elevator is weighed together with its housing.

An especially structurally simple and cost-favorable solution for measuring the total weight of the elevator is that, the elevator is supported movably parallel to the transporting direction of the harvested product on the harvester, is supported at the lower side on at least one first scale and/or is suspended on the first scale, and the first scale measures the weight force of the elevator parallel to the transporting direction. An inclination sensor is arranged on the harvester and on the elevator for determination of a correction factor for conversion of the weight force determined by the first scale parallel to the transporting direction into the weight force parallel to a gravitation factor. The inclination sensor measures the inclination of the elevator-transporting device to the gravitation vector. It can be formed for example as a pendulum device and the like.

Alternatively, it is also possible to suspend the elevator in a freely swinging manner with respect to the inclinations. This solutions is however structurally complicated. It is to be understood that with a parallel displaceable mounting of the elevator on the harvester it is not necessary that the displacing direction, or in other words the measurement in which vectorially the total weight force of the elevator is correspondingly measured, coincide with the transporting direction of the harvested product in the elevator.

The inclination sensor must measure in the position its two different inclinations in simultaneously, or two inclination sensors must be utilized and located perpendicular to one another, to determine the right-left inclination and the forward/rear inclination of the harvester in the terrain. For determination of the total weight force, the measured weight force is separated by the cosinus of both angles between the gravitation vector and the vector in the displacing direction or measuring direction.

It is especially advantageous in accordance with an inventive feature when the inclination sensor is supported on a second scale at a lower side, or a definite calibrating weight is suspended on a second scale so that it is located in a parallel direction to the measuring direction on the harvester or on the elevator. The weight measuring results of the first scales are set in relationship to the simultaneously produced weight measuring results of the second scales. For this purpose, the calibrating weight is supported in a shaft arranged parallel to the measuring direction, in which at the lower side the weight-detecting pressure point of the second scales is arranged. The calibrating weight is preferably the shape of a ball, but of course it can be any other shape, such as for example a cylindrical shape.

The ratio between the measured weight force of the calibrating weight and the actual calibrating weight can be then used directly to determine from the measured total weight of the elevator, the actual total weight of the elevator in direction of the gravitation vector. Simultaneously it is possible, by means of the calibration weight, also to compensate the mass forces superposed on the weight force and produced by roadway impacts on the field.

Since during harvesting both the transporting band and the transporting chain as well as the transporting shaft is dirtied, it is recommended to determine the empty weight of the elevator in certain intervals again. For this purpose it is advantageous to use the available empty running of the elevator during the harvesting, for example during a stop of the harvester or during turning back, and the like. The empty running condition can be determined for example by measuring devices for detection of the harvested product flow. They can be formed for example as capacitative, inductive measuring devices for light barriers, located for example at the inlet and at the outlet of the elevator. Also, they can be formed as simple mechanical switches, valve flaps, etc.

In principle, a measuring device is provided at the inlet of the elevator. After indication of the empty running by this measuring device, it is necessary to wait until the elevator is completely emptied and the empty weight can be measured.

In accordance with a preferable embodiment, the empty running condition of the elevator is recognized in dependence on the position of a harvesting tool of the harvester. For example, the evaluating device can be connected with the control device for the harvesting, for example the cutting mechanism of the harvester thresher. When the cutting mechanism moves from the working position, the control device produces a signal to the evaluating device, and after a predetermined time in which the elevator is completely emptied it assumes an empty running condition of the elevator. The time period between the signal of the control device and the assumption of an elevator empty running can be calculated in dependence corresponding transporting speed in the elevator.

During harvesting connected with great spacial and time moisture fluctuations in the harvested product, it is advantageous to provide the harvester with a corresponding device for moisture measurements in the harvested product. Such device can be a capacitative measuring device, an overflow container for determining a specific weight, etc.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
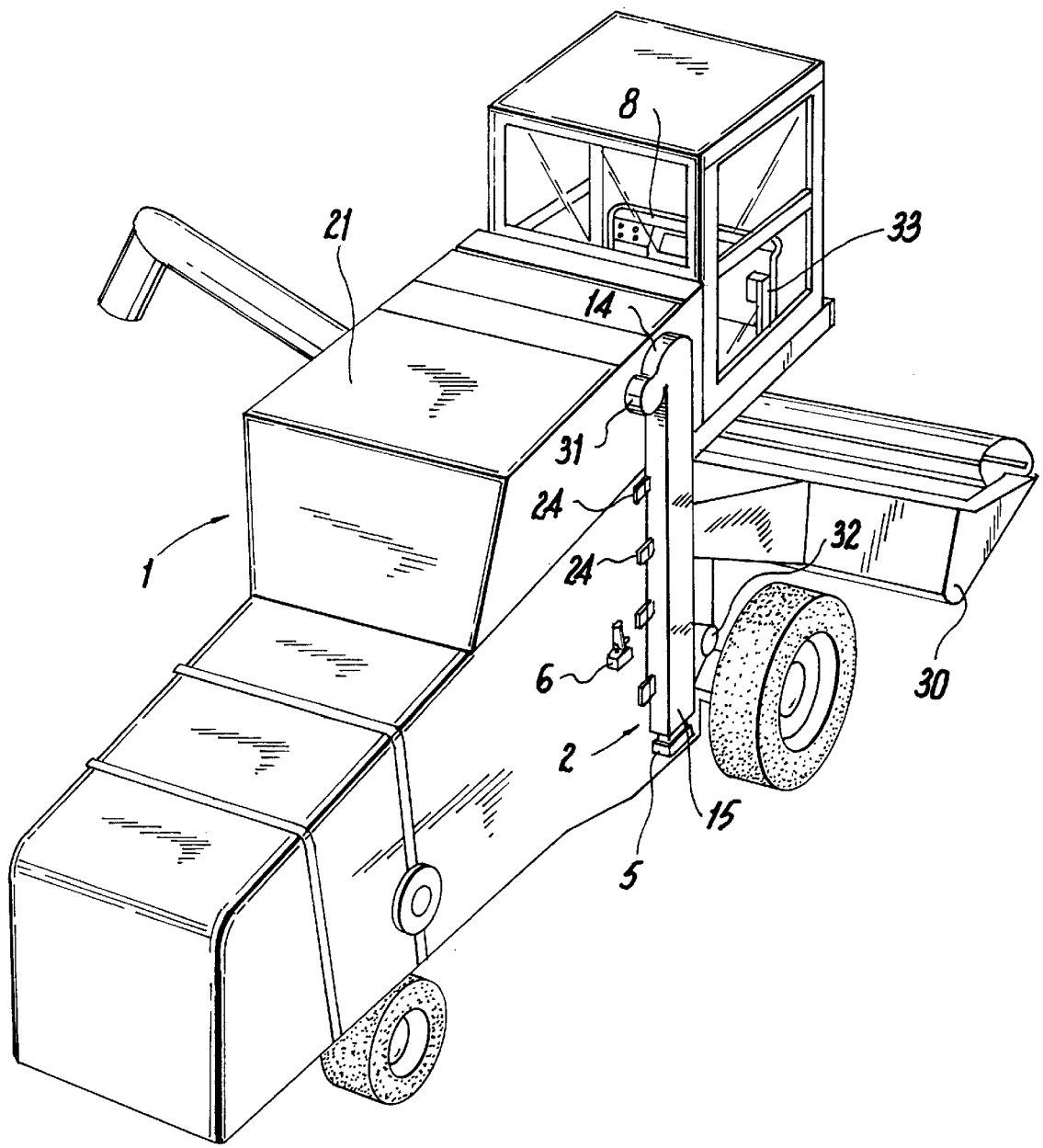
FIG. 1 is a perspective view of a harvester thresher with an elevator in accordance with the present invention.

A harvester in accordance with one embodiment of the present invention shown in FIG. 1 is identified as a whole with reference numeral 1 and formed as a harvester thresher. The harvester thresher has a harvested product preprocessing mechanism located in the lower region behind the cutting mechanism. The harvested product is supplied from the harvested product preprocessing mechanism to an elevator 2 through a transporting screw 32. The elevator 2 transports the harvested product along a transporting direction T perpendicularly upwardly. Here the harvested product 3 is transferred to a further transporting screw 31, which displaces the harvested product 3 into a storage 20 located above the harvested product preprocessing mechanism behind the drivers cabin of the harvester thresher 1.

The elevator 2 includes a transporting shaft 12, a return shaft 13 an elevator hat 14, and an elevator leg 15. Deviating wheels 16 and 17 are arranged in the elevator leg 15 and in the elevator head 14 and tension a motor-driven transporting band 18 or a transporting chain. The whole elevator 2 is covered with a housing 19.

The transporting band 18 or the transporting chain has individual chambers into which the harvested product 3 is supplied by the transporting screw 32 in the lower region from the side through a filling opening 26. In these chambers the harvested product 3 is transported upwardly and thrown onto the elevator hand 14 in a throwing opening 27, from where the harvested product 3 is transported further by a further transporting screw 31. The axes of the transporting screws 31, 32 are located parallel to the axes of the deviating wheels 16, 17.

Figure 2:
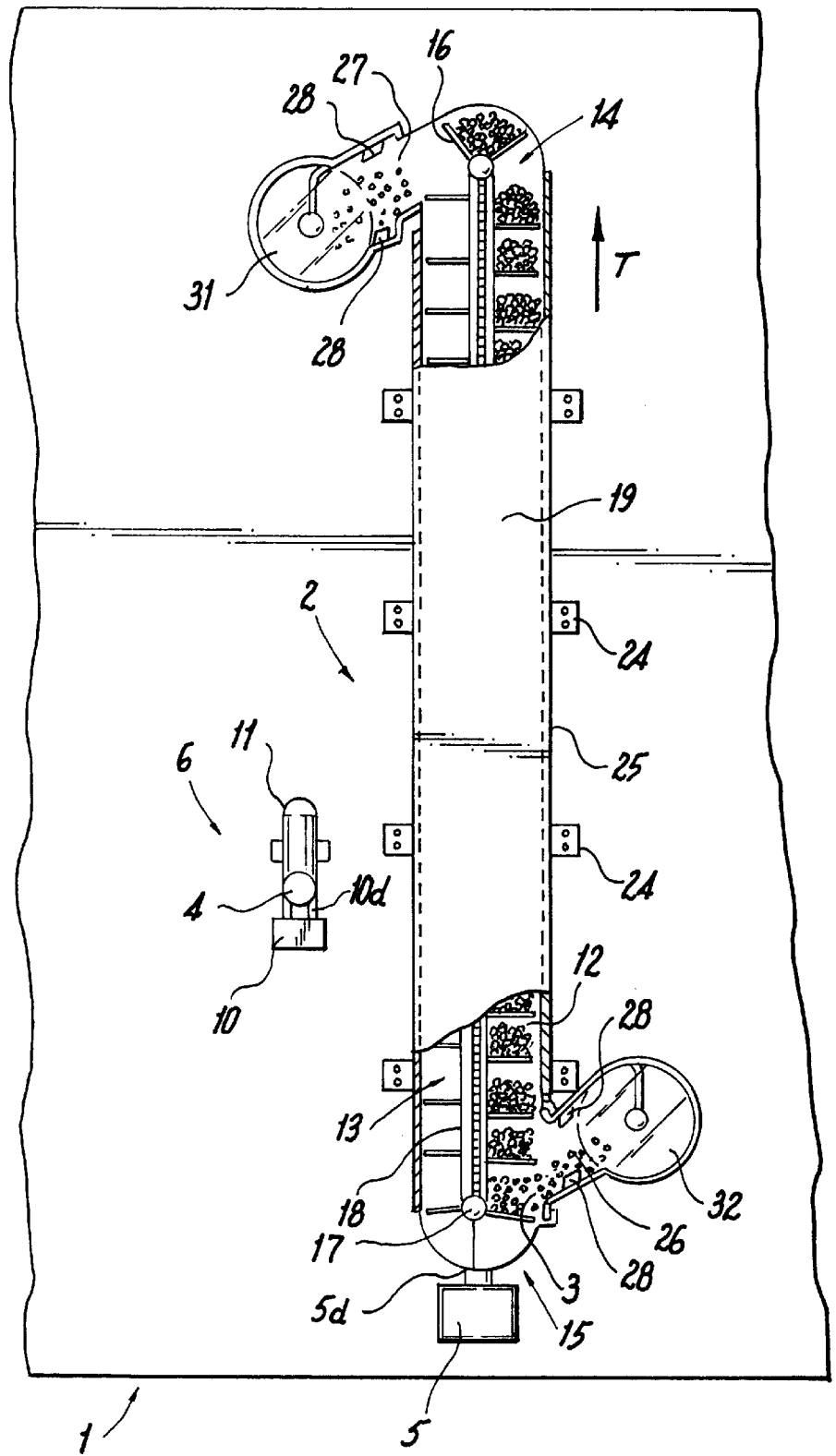
FIG. 2 is a side view with a partial section of the elevator of the harvester (schematically only a part is shown) of FIG. 1, as well as a partial section through an inventive inclination sensor with a calibrating weight.
Figure 3:
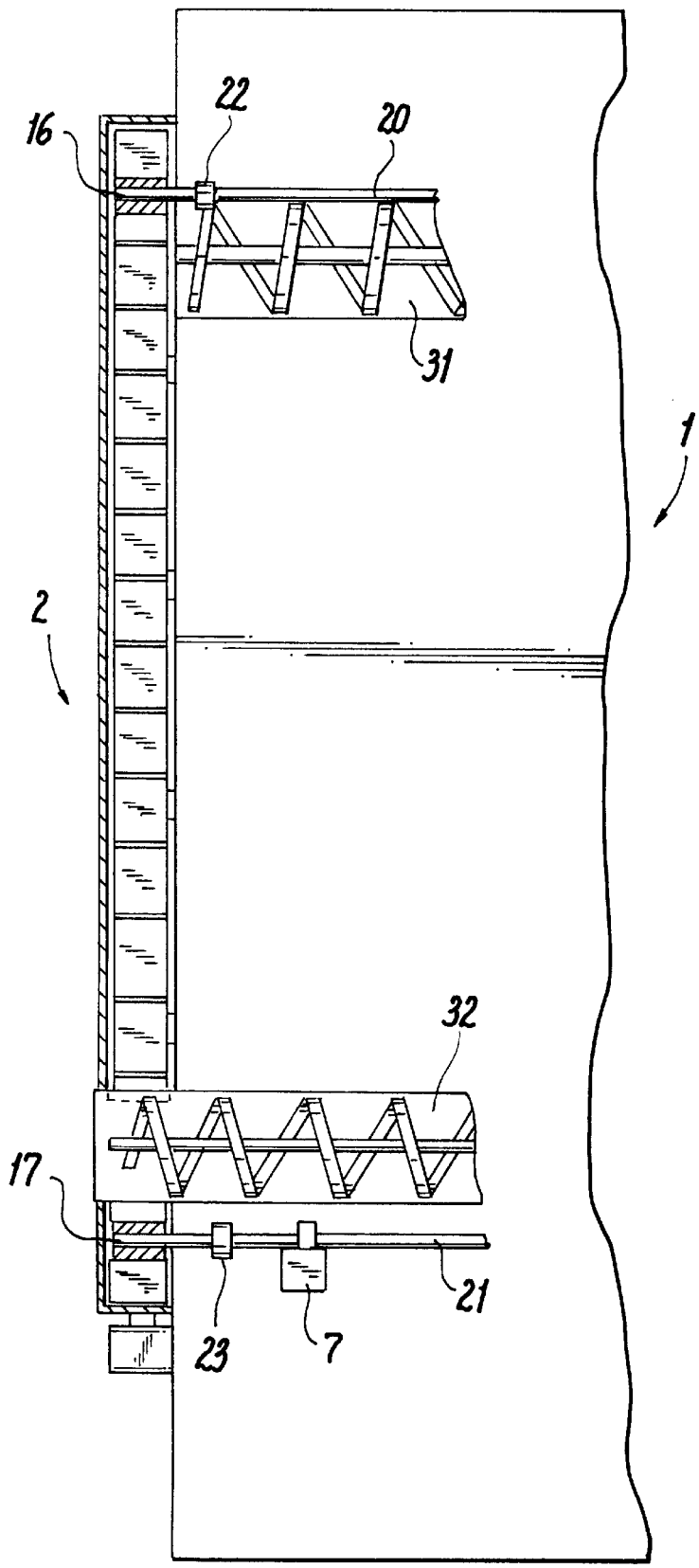
FIG. 3 is a side view of the elevator of FIG. 2 on a harvester (schematically only a part is shown) of FIG. 1 with a schematically shown driving and driven shaft as well as a supply screw and a discharge screw for the harvester

The whole elevator 2 is arranged on the harvester 1 so that it is movable parallel to the transporting direction T and is supported at the lower side on a scale 5. This first scale 5 measures the weight force of the elevator 2 parallel to the transporting direction T. The mounting of the elevator 2 on the harvester 1 in the shown embodiment of FIGS. 1, 2, 3 is performed by guiding claws 24. They form-lockingly surround the elevator housing 19 on guiding angles or rails 25 in a parallel displaceable manner. This holding of the elevator 2 can be also performed with a spherical support. Alternatively, the elevator 2 can be mounted on the harvester 1 by articulated rockers which are not shown in the drawings. The housings of both transporting screws 31, 32 are connected displaceably relative to the housing of the elevator 2 through filling or discharging shafts 28, 27. For this purpose the discharging shaft 27 is separated parallel to the displacement direction of the elevator 2 into a part which belongs to the elevator housing 19 and a part which belongs to the housing of the transporting screw 31. The part which belongs to the elevator extends opposite to the part which belongs to the transporting screw parallel to the displacement direction of the elevator 3 and is displaceable in this direction. A sealing of the parts relative to one another is performed by an end projection of the inwardly located part which belongs to the elevator and extends radially outwardly, and a corresponding end projection of the other part which extends radially inwardly. The filling shaft 28 is connected with the elevator housing 19 in a similar way. Here the filling shaft is completely arranged on the housing of the transporting screw 32 and extends on an opening of the elevator housing 19. The sealing is performed by corresponding overlapping projections or folds on the filling shaft 28 and on the elevator housing 19.

It is to be understood that other structural solutions are also possible for connection of the transporting screws 31, 32 with the elevator 2.

Preferably, the deviating wheel 17 located in the elevator leg 15 simultaneously operates as a drive wheel for the transporting band 18 or the transporting chain. For this purpose in the shown embodiment, the wheel 17 is connected by a cardan torque coupling 23 with a drive shaft 21 of the harvester 1 extending perpendicular to the displacement direction of the elevator 2. The perpendicular position of the shaft 21 and the coupling through a cardan torque coupling 23 is needed so that no forces are transmitted which falsify the weighing results. The drive shaft 21 can be also coupled for example with the transporting screw 32, so that the transporting speed of the transporting screw 32 is positively coupled with the transporting speed in the elevator 2. The coupling between the transporting screw 32 and the drive shaft 21 must be naturally performed at the side of the harvester before the cardan torque coupling 23. Alternatively, it is also possible to connect the drive wheel 17 for example directly with the transporting screw 32 by means of a chain and the like. It should be taken into consideration that the chain also extends perpendicular to the transporting direction T in the elevator 2, or in other words to the weighing direction, so that no forces which can falsify the weighing results are transmitted. A rotary speed counter 7 or the like is located on the drive shaft 21 for determining the transporting speed in the elevator 2.

In the harvesters 1 with a constant rotary speed, such a measuring device 7 can be of course dispensed with. The transporting speed in the elevator 2 is then given initially to the evaluating device.

The deviating wheel 16 located in the elevator head 14 is connected as a drive wheel with a driven shaft 20 which extends perpendicular to the transporting direction 2, for driving further devices of the harvester 1 by a cardan torque coupling 22. For example, the upper transporting screw 31 can be driven through the driven shaft 20. Also, other technical drive possibilities are possible, for example through a separate drive from another location. It should be taken into consideration, however, that no forces are transmitted in the transporting direction.

The scale 5 is formed for example as a regulated compensating scale which maintains opposite to the corresponding weight force of the elevator 2 the supporting point 5 D in a constant position relative to the displacing direction of the elevator 2, or in other words the elevator transporting direction T. The force required for it is determined by the compensation scale 5 as a measure for the weight force and supplied to an evaluating device 8. The utilization of such a compensation scale has the advantage that it deals only with insignificant displacements of the elevator 2 along the transporting direction T. Therefore the filling and the discharging openings 27, 28 are located approximately always in the same position relative to the transporting screw 31, 32 and the drive shaft 21, 20 only insignificantly buckle in the cardan torque couplings 22, 23.

A shaft 11 formed as a tube, a sleeve and the like is located parallel near the elevator 2 on the harvester 1. A ball 4 formed as a calibrating weight 4 is displaceably supported in the shaft. The ball 4 is supported at the lower side on a second scale 10.

Both scales 5 and 10 as well as the rotary speed counter 7 are connected with an evaluating device 8. In this case it can be formed as a board computer of the harvester thresher.

The calibrating device 6 can be also arranged on any other location of the harvester 1, for example in the driver's cabin or on the elevator 2. The important point is that the shaft 11 must be located parallel to the displacement direction of the elevator 2.

The determination of the harvested product quantity is performed in the following manner:

The total weight of the elevator 2 is continuously measured by the scale 5. Simultaneously, in the harvesters 1 without constant motor rotary speed, the transporting speed in the elevator 2 is continuously determined by the measuring device 7. For correction of the elevator total weight in an inclined position of the harvester 1, the measured vectorial total weight force of the elevator 2 is set in relationship to a corresponding weight force of the calibrating weight 4 arranged on the harvester 1 measured vectorially simultaneously in a parallel direction, on the scale 10.

All data are transmitted to an evaluating device 8, for example to the board computer of the harvester thresher 1. The evaluating device 8 multiplies the measured and corrected total weight of the elevator 2 with the corresponding transporting speed in the elevator 2. The thusly determined data are then summed in a predetermined time interval, for which the throughgoing harvesting product quantity must be determined, or integrated over the time interval, and the total weight is distributed over the effective transporting path of the harvested product 3 in the elevator 2. With a total weight force G (t) corrected already to the inclination, and empty weight $G_L$ of the elevator 2 also corrected to the inclination, a transporting speed V (t) and an effective transporting path X, the harvested product quantity M running in the time period T from a time point $t_1$ to a time point $t_2$ through the elevator 2 is as follows:

$$M = 1/X \cdot \int_{t=t_1}^{t2} V(t)(G(t) - G_L)dt$$

With constant transporting speed in the elevator 2, the constant speed value $V_k$ inputted in the evaluating device 8 is multiplied after the integration with the integrated total value. The corresponding formula is then as follows:

$$M = V_k/X \cdot \int_{t=t_1}^{t2} V(t)(G(t) - G_L)dt$$

During the empty running times of the elevator 2, the measured weight of the elevator 2 is taken over automatically as a new, actual empty weight of the elevator 2. For this purpose the elevator 2 is provided with a measuring device 28 for detection of the harvested product flow in its filling shaft 26 and its throwing shaft 27.

When no harvested product is transported through the openings, a signal is supplied to the evaluating device 8, which registers the empty running condition of the elevator 2 and performs the empty weight calibration.

Alternatively, it is proposed to determine the empty running condition of the elevator 2 in dependence on the position of a harvesting tool 30, for example the cutting mechanism of the harvester thresher 1. For this purpose the evaluating device 8 is connected with the control device 31 for the cutting mechanism. The control device 31 supplies a signal to the evaluating device 8 during lifting of the cutting mechanism from the working position. After a predetermined time in which the cut material must again leave the elevator 2, an empty running of the elevator 2 is taken from the evaluating device 8 till further lowering of the cutting mechanism 30 and the empty weight calibration is correspondingly performed.

The evaluating device 8 can be connected for example to the board computer of the harvester 1 or can be formed directly by the board computer. The evaluating device 8 can be naturally a simple analog circuit which multiplies, divides and segmentarily integrates the continuously measured values.

The transporting path K in the elevator 2 is measurable in principle and substantially corresponds to the height of the elevator 2. However, it is desirable to utilize this value as calibrating values and to provide corresponding variations and corresponding adjustments for example in workshop or during maintenance works.

It is to be understood that it is possible to adjust the determined weight value or the determined harvested product quantity of the evaluating device 8 by known correction processes. For example, calibration measurements with different filling degrees of the elevator 2 can be performed and the thusly obtained calibration functions can be taken into consideration during the evaluation.

It will be understood that each of the elements described above, or two or more together, may also find a useful application in other types of constructions and methods differing from the types described above.

While the invention has been illustrated and described as embodied in method of measuring harvested product quantity in elevator of harvester, and harvester with elevator for performing the method, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A harvester comprising; an elevator which transports a harvested product supplied at a lower side thereof to an upper side thereof; at least one scale associated with said elevator so as to measure a total weight of said elevator together with a harvested product on said elevator; at least one evaluating device receiving data of an empty weight of said elevator and data obtained from said at least one scale of the total weight of said elevator together with a harvested product on said elevator to determine a quantity of the harvested product transported by said elevator.

2. A harvestor as defined in claim 1, wherein said at least one scale is arranged at a suspension point of said elevator on the harvester.

3. A harvestor as defined in claim 1, wherein said at least one scale is arranged on a supporting point of said elevator on the harvester.

4. A harvestor as defined in claim 1, wherein said evaluating device stores said determined data.

5. A harvestor as defined in claim 1, wherein said evaluating device supplies the determined data to a further processing.

6. A harvester as defined in claim 1, wherein said evaluating device indicates the determined data.

7. A harvestor as defined in claim 1; and further comprising means for measuring a transporting speed of the elevator.

8. A harvestor as defined in claim 1, wherein said elevator has a transporting shaft, a return shaft, an elevator head, an elevator leg, deviating wheels arranged in said elevator leg and in said elevator head, a transporting element which is motor-driven and tensioned by said deviating wheels, and a housing, arranged so that the harvested product is supplied at a lower side of said elevator laterally and transported by said elevator upwardly.

9. A harvestor as defined in claim 8, wherein said elevator transports the transported harvested product further laterally.

10. A harvestor as defined in claim 8; and further comprising a storage which is filled by said elevator at the upper side.

11. A harvestor as defined in claim 1, wherein said elevator is supported movably parallel to a transporting direction, said at least one scale measuring a weight force of said elevator parallel to the transporting direction; and an inclination sensor measuring an inclination of an elevator transporting direction to a gravitational vector for determination of a correction factor for converting the weight force determined by said at least one scale parallel to the transporting direction into a weight force parallel to the gravitational factor.

12. A harvestor as defined in claim 11, wherein said elevator is supported at the lower side on said at least one scale.

13. A harvestor as defined in claim 11, wherein said elevator is suspended at the lower side on said at least one scale.

14. A harvestor as defined in claim 10, wherein said inclination sensor is arranged on the harvester.

15. A harvestor as defined in claim 10, wherein said inclination sensor is arranged on said elevator.

16. A harvestor as defined in claim 10, and further comprising a second scale, said inclination sensor including a definite calibrating weight associated with said second scale and movably supported parallel to the transporting direction of said elevator so that weight measuring results of said at least one scale are set in relation to simultaneously obtained weight measuring results of said second scale.

17. A harvestor as defined in claim 16, wherein said calibrating weight is supported at a lower side on said second scale.

18. A harvestor as defined in claim 15, wherein said calibrating weight is suspended on said second scale at an upper side.

19. A harvestor as defined in claim 15, wherein said calibrating weight is movably supported on the harvester.

20. A harvestor as defined in claim 15, wherein said calibrating weight is movably supported on said elevator.

21. A harvestor as defined in claim 15; and further comprising a shaft arranged parallel to the transporting direction of said elevator and accommodating at a lower side a weight-determining pressure point of said second scale, said calibrating weight being displaceably supported in said shaft.

22. A harvestor as defined in claim 15, wherein said calibrating weight is a ball.

23. A harvestor as defined in claim 1, wherein said elevator has at least one motor driving said transporting element.

24. A harvestor as defined in claim 23, wherein said at least one motor is an electric motor.

25. A harvestor as defined in claim 23, wherein said at least one motor is a pressure medium motor.

26. A harvestor as defined in claim 23, wherein said motor has a rotatable drive shaft which is driven from the harvester.

27. A harvestor as defined in claim 8; and further comprising a machine motor drive; a drive shaft connecting said motor drive perpendicularly to the transporting direction with one of said deviating wheels which forms a drive wheel.

28. A harvestor as defined in claim 8; and further comprising a further device of the harvester; and a driven shaft connected with one of said deviating wheels as a driven wheel perpendicularly to the transporting direction for driving said further device.

29. A harvestor as defined in claim 1, wherein one of said deviating wheels form a first wheel; and further comprising a shaft; and a cardan torque coupling connecting said first wheel with said shaft.

30. A harvestor as defined in claim 1, wherein said elevator is supported on said at least one scale formed as a regulated compensation scale which maintains opposite to a weight force of said elevator a supporting point in a constant position relative to a displacement direction of said elevator, which detects a force required for this as a measure of the weight force, in which supplies the detected weight force to said evaluating device.

31. A harvestor as defined in claim 1, and further comprising a supporting structure; and articulated rockers mounting said elevator on said supporting structure.

32. A harvestor as defined in claim 1; and further comprising a supporting structure; and guiding claws which mounts said elevator on said supporting structure so that said elevator is held and guided parallel displaceable.

33. A harvestor as defined in claim 32; and further comprising an elevator housing, said guiding claws form-lockingly surround said elevator housing.

34. A harvestor as defined in claim 32; and further comprising an elevator housing having a part, said guiding claws form-lockingly surrounding said part of said elevator housing.

35. A harvestor as defined in claim 1, herein said elevator has an input opening and an output opening; and further comprising a device for detecting a harvested product flow arranged on at least one of said openings and indicating an empty running of said elevator of said evaluating device.

36. A harvestor as defined in claim 1, and further comprising a control device for a harvesting tool, said evaluating device being connected with said control device for a harvesting tool so that a movement of said harvesting tool from a working position is registered by said evaluating device and after a predetermined time an empty running condition of said elevator is recognized by said evaluating device and after a predetermined time an empty running condition of said elevator is recognized by said evaluating device.

37. A harvestor as defined in claim 36, wherein said evaluating device is formed so that the empty running condition of said elevator is recognized after the predetermined time in dependence on a transporting speed of said elevator.

* * * * *